United States Patent [19]
Filepp et al.

[11] 3,874,194
[45] Apr. 1, 1975

[54] GEAR TYPE TORSION COUPLING WITH QUICKLY REPLACEABLE SLEEVE

[75] Inventors: Leslie Filepp, Colts Neck; James S. Jones, Westfield; Charles Allia, Mercerville, all of N.J.

[73] Assignee: Midland-Ross Corporation, Cleveland, Ohio

[22] Filed: Apr. 12, 1974

[21] Appl. No.: 460,561

[52] U.S. Cl. ............... 64/9 R, 64/14, 64/6, 64/32
[51] Int. Cl. ................................ F16d 3/18
[58] Field of Search ............ 64/9 R, 9 A, 14, 6, 32

[56] References Cited
UNITED STATES PATENTS
2,421,546   6/1947   Dalton ........................... 64/9 R
2,924,954   2/1960   Parhard .......................... 64/9 R
2,957,322   10/1960  Simons et al. .................... 64/9 A
3,313,124   4/1967   Filepp ........................... 64/9 R FOREIGN PATENTS OR APPLICATIONS
811,979   4/1937   France ............................ 64/9 R Primary Examiner—Samuel Scott
Assistant Examiner—Randall Heald
Attorney, Agent, or Firm—Woodrow Portz

[57] ABSTRACT

A coupling for shaft-to-shaft power transmission which comprises two externally toothed hubs for attachment to opposing shaft ends, and an internally toothed sleeve in mesh with the teeth of the hubs. The sleeve is constructed in two or more arcuate sections normally secured together over the hubs by an encircling band-like member.

11 Claims, 9 Drawing Figures

3,874,194
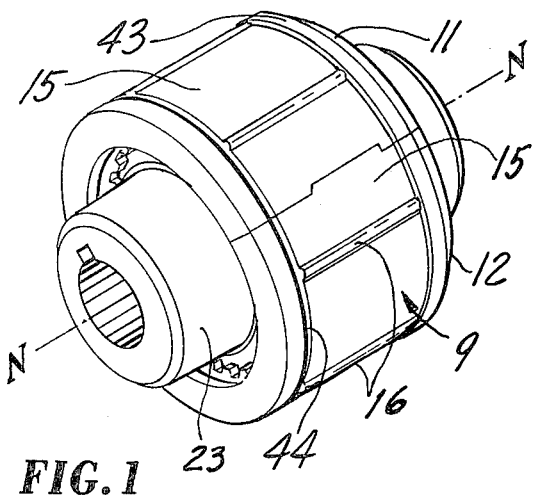
FIG.1
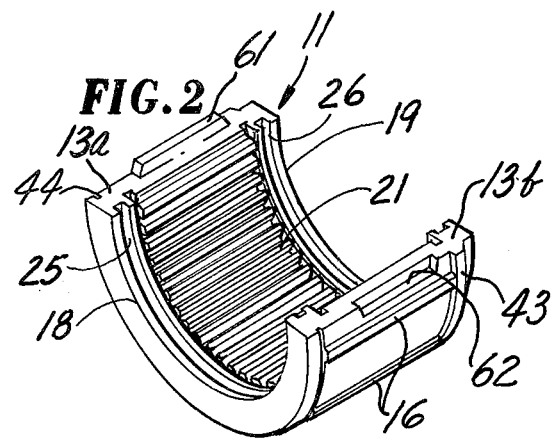
FIG.2
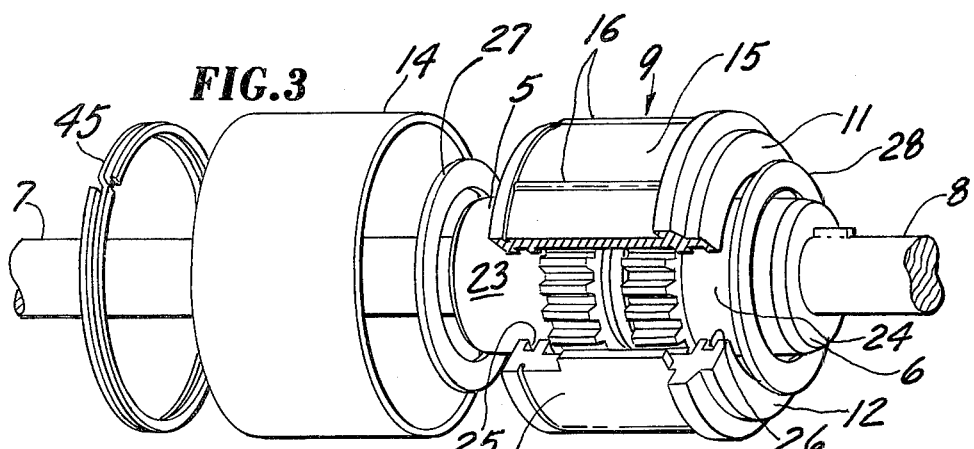
FIG.3
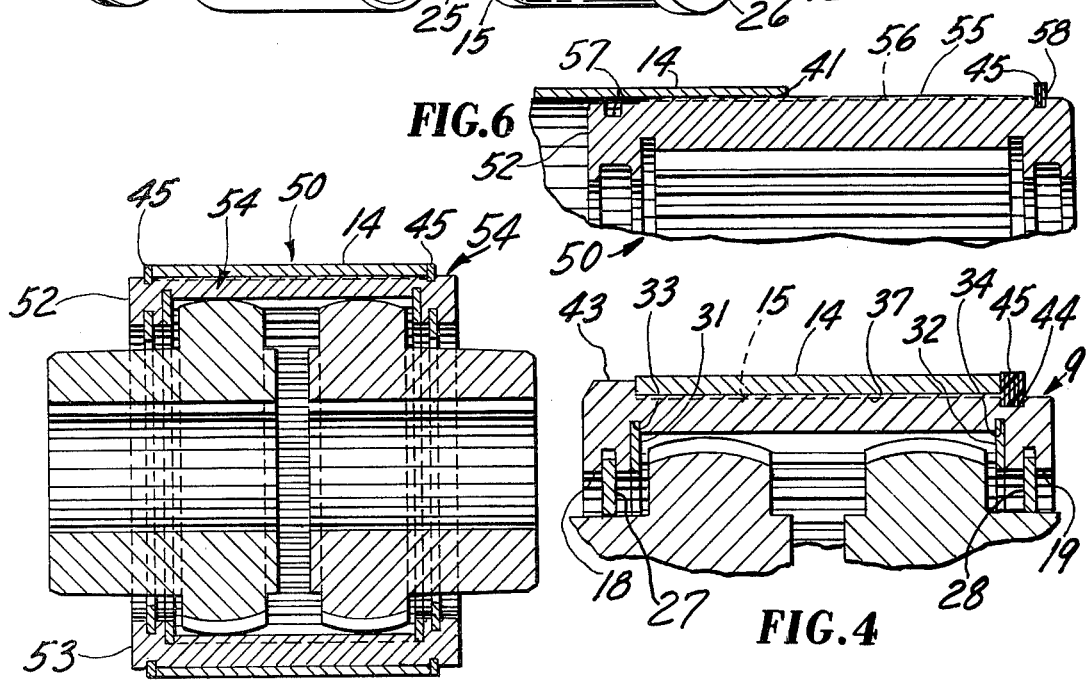
FIG.6
FIG.5
FIG.4

3,874,194

GEAR TYPE TORSION COUPLING WITH QUICKLY REPLACEABLE SLEEVE

BACKGROUND OF THE INVENTION

Gear type couplings conventionally comprise two hubs, each having external teeth at one end and a bore adapting the hub to receive a shaft and be keyed thereto in a sleeve with internal teeth which receives the toothed portions of the hubs within opposite end portions of the sleeve. The sleeve is almost invariably secured in axial relation with the hubs by means, such as removable retaining rings, at opposite ends of the sleeve which may be secured by screws, or may be of split ring steel construction to snap into internal annular grooves of the sleeve.

In recognizing the inevitability of wear, either the sleeve or the hubs, usually the latter, are manufactured with greater resistance to hardness so that the other, e.g., the sleeve, will be preferentially worn and can be replaced without replacement of the other elements. The removal of a sleeve and the coupling just indicated entails detachment of the retaining rings, and detachment of at least the driving shaft or the driven shaft from its normal operating location.

It is a principal object of this invention to provide a gear type coupling which comprises a low cost, cheaply manufactured sleeve capable of being quickly removed from, or installed on, the hubs of the coupling without any disturbance of the mounting of the hubs or the shafts connected by the coupling.

Other objects ancillary to the above object are that the sleeve be inherently self-lubricating; that it be sufficiently flexible that a sleeve formed of longitudinally split sections may flex sufficiently to snap into place over a circular portion of the tooth periphery of each hub; that the material of the sleeve maintain a fairly constant range of characteristics within a temperature range of 150°F., e.g., 50° to 200°F.; that the sleeve comprise an injection moldable material in order to attain low cost; that the sleeve be of a design through which very accurately fitting coupling construction may be achieved without need for the precision entailed in very low tolerance molding.

Some of the advantages in achieving the above objects are that the shafts may be quickly disconnected for any reason, the coupling may be quickly disassembled for inspection purposes and broken or worn elements of the coupling may be quickly replaced, and that the coupling may be quickly disassembled for shaft realignment.

SUMMARY OF THE INVENTION

According to the invention, the gear coupling comprises a cylindrically shaped, internally toothed sleeve which is split along one or more longitudinal radial planes. The resulting sleeve sections are secured tightly together by a non-elastic cylindrical shell, such as one made of steel. The sleeve consists preferably of a moderately resilient, self-lubricating, synthetic elastomer which has a higher wear rate than the relatively hard material, e.g., steel, of the hub teeth. The sections and the hub in a preferred embodiment have a full perimeter of complementary teeth. In order that a sleeve section may assume its complementary position on a half circle of hub teeth, each section is required to have sufficient flexibility, i.e., a range of durometer hardness in the order of 50 to 70, as measured on the D scale of the Shore Scleroscope to allow diametral springing enabling a section, e.g., a sleeve half, to slip or snap over the terminal teeth within the corresponding half peripheries of both hubs. To minimize wear, the materials of the sleeve is selected to provide all possible lubricity consistent with the required hardness of the material.

To ensure snug fit and allow lower manufacturing costs, the outer surface of the sleeve in a preferred embodiment is formed with small projections, such as circumferential spaced, longitudinally extending ridges extending radially outwardly, e.g., two or three hundredths of an inch in height, beyond the inner diameter of the shell to cause the shell to fit tightly over the projections either by the compression thereof or by the trimming of the peaks thereof during placement of the shell on the sleeve.

BRIEF DESCRIPTION OF THE DRAWING

FIG. 1 is a perspective view of the coupling of the invention shown in assembled condition but with several parts removed.

FIG. 2 is a perspective view of a sleeve section from the coupling shown in FIG. 1.

FIG. 3 is an exploded view of the coupling of FIG. 1 with a portion of one sleeve section cut away.

FIG. 4 is a fragmentary view in section taken along a longitudinal diametral plane of the coupling shown in FIGS. 1 and 3.

FIG. 5 is a sectional view of a modified coupling taken along a longitudinal diametral plane thereof.

FIG. 6 is a fragmentary view in longitudinal radial section showing an outer reinforcing shell in partially enveloping relation with the outer surface of the sleeve of the coupling of FIG. 5.

DESCRIPTION OF PREFERRED EMBODIMENTS

Figure 8:
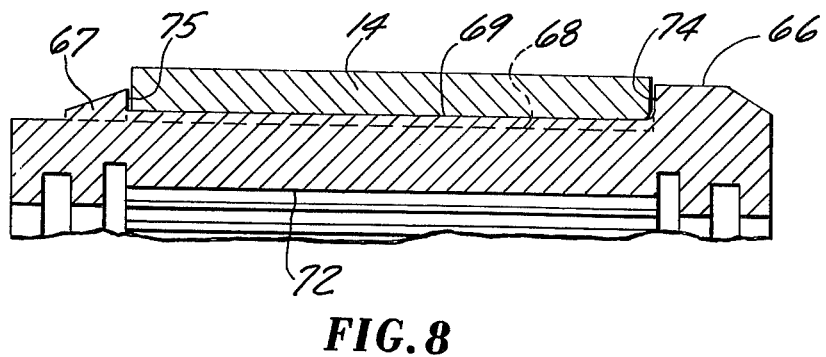
FIG. 8 is a fragmentary sectional view of the sleeve of the coupling of FIG. 7 taken along a longitudinal diametral plane thereof.

FIGS. 1-4 illustrate a coupling comprising, as its principal elements, hubs 5, 6 mounted on shafts 7,8, respectively; an internally toothed sleeve comprising sections in the form of halves 11,12; a cylindrical shell 14 adapted to fit over the outer surface 15 of the sleeve 9. As FIGS. 3 and 4 indicate, the sleeve is provided with internal teeth which mesh with external teeth of the hubs. The teeth of the hubs occur on end portions thereof housed within the sleeve 9. The other untoothed portions of the hubs are externally smooth and generally cylindrical and axially bored to receive respective end portions of the driving and driven shafts 7,8. The sleeve sections 11,12 separate along a longitudinal radial plane of the coupling containing the coupling axis N—N and containing, e.g., radial edges or surfaces 13a and 13b of sleeve half 11 (see FIG. 2).

Because of the separability of the sleeve sections, the sleeve of this invention may be constructed with integral flanges 18, 19 which extend radially inwardly beyond the internal teeth 21 of the sleeve.

As shown, the flanges 18,19 are formed with internal annular grooves 25,26 which receive seal rings 27,28. The inner diameters of seal rings 27,18 preferably agree closely or interfere with the outer diameters of the hub surfaces 23,24. The outer diameters of seal rings 27,28 need not agree closely with the maximum diameter or full depth of the grooves 25,26 to allow for more working freedom of the rings within the grooves during misalignment of the shafts 7 and 8 as long as the rings are of sufficient outer diameter to remain at all times in at least partially radially overlapping relation with the sides of the grooves in maintaining sealed enclosure of the internal region of the coupling. In assembling the coupling, these seal rings 27,28 are placed on respective hubs 5, 6 and the grooves of the separated sleeve halves brought into registry with the rings.

The coupling further comprises internal guard rings 31, 32 having outer circumferential portions received in annular internal grooves 33, 34 of sleeve sections. A side of each ring 31, 32 fits against an inner side or radial surface of the integral flanges 18, 19 to protect these surfaces from scuffing by the adjacent hub teeth.

The sleeve sections 11, 12 are secured together along their parting plane by the shell 14, usually of steel or other metal, located over the circumferential surface 15 as shown in FIG. 4. Surface 15 is provided with projections spaced substantially uniformly thereover such as nodules, or the plurality of ridges 16 shown, which extend in the axial or longitudinal direction of the coupling. The ridges project radially outwardly from the surface 15 to a surface of revolution having a circumference slightly greater than the inner cylindrical surface 37 of the shell. When the shell 14 is in place as shown in FIG. 4, the ridges 16 are either flattened or trimmed off in sliding the shell 14 into the position shown.

For example, in the practice of the invention, a coupling for connecting shafts of 1 ½ inches in diameter has an outer sleeve diameter, i.e., the diameter of the surface 15, of 4.125 inches. The ridges 16 project 1/32 or approximately 0.03 of an inch outwardly from the surface 15. A shell 14 having an internal diameter of 4.15 inches deforms the ridges to approximately one-half their height by either compression or trimming off the top portion of the ridges as the shell 14 is slid into place in an axial direction over the surface 15. The edge 41 of the shell 14 may be chamfered or rounded along its internal diameter as shown in FIG. 6 to induce a compressed condition of the ridges. A sharp square edge will tend to trim off the ridges.

The shell 14 is secured from any longitudinal or axial displacement relative to the sleeve 9 by an annular shoulder 43 which engages one side edge of the shell 14. The shoulder extends radially outwardly from one end of the surface 15. The sleeve 9 defines an annular groove 44 extending radially inwardly from the opposite end of the surface 15 in which is received a snap ring 45. Because of the split construction of the sleeve, the ring 45 is preferably of a construction providing a plurality of circular convolutions such as shown in FIG. 3. A multiple convolution ring avoids the possibility of a split of a single convolution ring occurring at the parting plane of the sleeve halves.

A coupling 50 of modified design shown in FIGS. 5 and 6 differs from the coupling 4 of FIGS. 1–4 essentially by the manner in which the shell 14 is secured over the halves 52, 53 of sleeve 54. The sleeve of this embodiment has no retaining shoulder, such as shoulder 43 of sleeve 9. Sleeve 54 has a smooth outer cylindrical surface except for a plurality of longitudinally extending ridges 55 rising radially outwardly from the cylindrical surface 56 and grooves 57, 58 which indent radially inwardly from the surface 56 to receive retaining rings 45 at each end of the shell 14.

A further feature of the invention is the tongue and notch construction of the sleeve sections which enables them to be secured together in positive mating axial alignment independent, e.g., seal rings 27, 28 or locking rings 45. Since these rings go into place with some clearance, there is some opportunity for warping of the sleeve sections relative to each other during operation were it not for (looking now at FIG. 2) a tongue 61 projecting in a circumferential direction from edge surface 13a and a notch 62 recessed in a circumferential direction from the surface 13b. The radial outer surface of the tongue is preferably a projection of the circumferential surface 15 of the sleeve.

The notch 62 is preferably open sided within the surface 15 for the reason that identical coupling sections as shown in FIG. 2 are formed to provide a continuous internal tooth structure of the sleeve 9 which meshes with or encloses all teeth of the hubs 5, 6. Because of this complete configuration of the teeth in the sleeve, the sleeve 9 is constructed of a slightly resilient material which permits the coupling halves to yield slightly in a diametrical direction taken across surfaces 13a, 13b to enable each sleeve section to yield slightly as it is forced over the teeth of the hub into full conformity with a circular portion of the hub teeth. Because of this slight yield in assembling the sleeve sections over the hubs, the notch 62 is open sided in an outward radial direction and the tongue 61 is molded with high conforming precision to minimize any axial relative freedom of movement of the sleeve sections.

Figure 7:
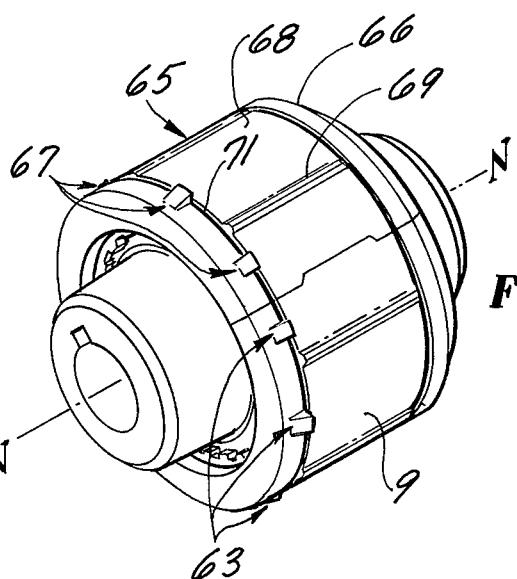
FIG. 7 is a perspective view of another modified coupling characterized by shell retaining bosses but shown with its outer shell removed.
Figure 9:
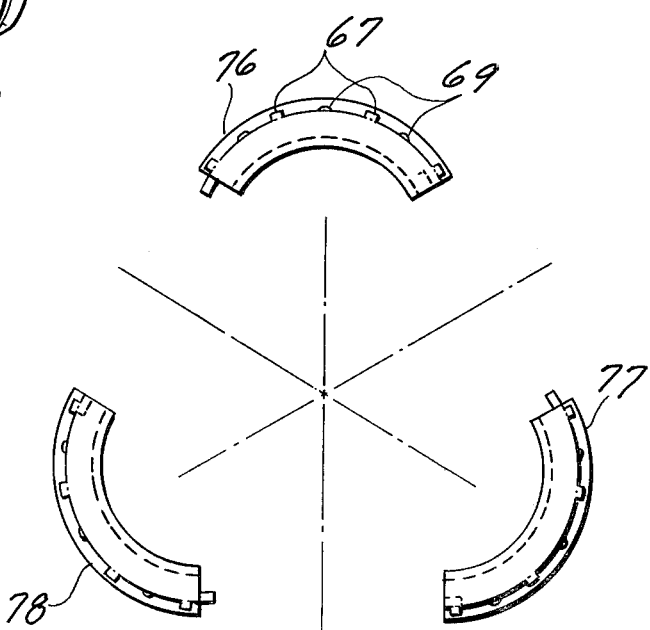
FIG. 9 is an exploded end view of the sleeve of the coupling of FIG. 7 showing its three section construction.

FIGS. 7, 8 and 9 relate to a coupling 65, as an additional embodiment of the invention distinguished from the other earlier described couplings primarily by a sleeve 66 which is formed with small studs or nodules 67 at the edge of the cylindrical area 68 normally covered by a shell, such as the shell 14. Ridges 69, similar to ridges 16 of an earlier described embodiment, extend longitudinally of the coupling, i.e., parallel to the coupling axis N–N the full width of the surface 68 up to the circumference 71 along which the bosses 67 face toward the surface 68.

As shown in FIG. 8, the bosses 67 are substantially higher than the ridges 69. Whereas the ridges may be 1/32 in height, the bosses 67 are of a height in the order of 3/32 inch to ⅛ inch high as measured in a radial direction from the surface 68 in which they are based. The bosses 67 are preferably located longitudinally toward the adjacent end of the sleeve out of radial alignment with teeth 72 since the sleeve is resilient and yields along this portion in a radial inward direction more readily than portions of the sleeve in radial alignment with the teeth 72. As shown, the bosses 67 are shaped along surfaces facing radially outward to facilitate the placement of the shell on the sleeve by being sloped from a diameter less than the inner diameter of its shell 14 to a diameter greater than such inner shell diameter in a radially outward direction proceeding longitudinally toward the surface 68.

In assembling the coupling, the shell 14 is passed over the left end of the sleeve 66 as shown in FIG. 8 and over the bosses 67 which deform and yield inwardly to conform to the inner cylindrical surface of the shell. As the shell engages the shoulder 74, the resilient deformation of the sleeve occurring within the end portion thereof in and around the bosses 67 is relieved and the sleeve returns to its original shape, placing the bosses radially outwardly with faces 75 thereof in abutting relation as shown with the end surface of the shell.

FIG. 9 illustrates that the sleeve 66 may be formed of three sections 76, 77, 78, each extending in an arc of 120 degrees, illustrating that the invention is not limited to the mating "halves" construction of the previously described embodiments. The three sections shown are identical and are provided with the tongue and recess construction hereinbefore described with respect to tongue 61 and recesses 62 to enable the sections to interlock against any longitudinal misalignment.

As the sleeve 65 is normally discarded when removed from the hubs, to remove the shell 14, the studs 67 may be preliminarily trimmed away whereupon the shell is driven off the sleeve and the sleeve sections are picked off of the hubs. The studs will also be trimmed by the shell as it is driven off of the sleeve.

Typical of materials used for forming the sleeve sections are polyurethane and nylon resins which have a hardness of 50 to 70 (Shore Scleroscope D scale). Synthetic resins which are capable of maintaining a fairly constant range of characteristics in the range of from 50°F. to 200°F. are particularly desirable. For good service life, it is essential that the sleeve material have self lubrication or lubricity characteristics to the highest degree possible consistent with the other parameters of hardness, toughness and strength. From the standpoint of producing couplings which will be competitive in commerce, it is essential that the material of the sleeve 9 and 54 be injection moldable.

What is claimed is:

1. A coupling for connecting a pair of end-to-end shafts comprising:
   a pair of shaft hubs, each having external gear teeth around an end portion of its periphery, its opposite end portion being of smooth circular contour;
   a sleeve with internal teeth in meshing relation with the teeth of both hubs, said sleeve comprising multiple sections having longitudinal edges abutting along multiple radial parting planes, and having flange means at each end extending radially inwardly beyond said internal teeth;
   a cylindrical shell extending tightly over the outer cylindrical surface of said sleeve holding said sections in tight engagement along said planes;
   retaining means in radially raised and fixed relation with the periphery of opposite end portions of the sleeve adjacent opposite ends of the shell for axially confining said shell on the sleeve between said portions, said retaining means on one of said portions being removable to enable disassembly of said shell and said sections.

2. The coupling of claim 1 wherein:
said sleeve comprises projections spaced uniformly over said cylindrical surface and extending radially outwardly therefrom to a surface of revolution of slightly greater diameter than that of the inner surface of said shell before installation of said shell, said projections conforming to the inner surface of said shell by compression or loss of radially outward portions of the projections after installation on said sleeve.

3. The coupling of claim 2 wherein:
said projections are ridges extending axially between said end portions of the sleeve.

4. The coupling of claim 1 wherein:
said retaining means at said one end is an integral circumferential ridge on one end portion of the sleeve and snap ring means received in a circumferential groove in the periphery of the other end portion of the sleeve.

5. The coupling of claim 1 wherein:
said retaining means at said one end is snap ring means received in a circumferential groove in the periphery of each end portion of the sleeve.

6. The coupling of claim 1 wherein:
said retaining means at said one end is a plurality of bosses fixed to said sleeve.

7. The coupling of claim 1 wherein:
said retaining means at said one end is a plurality of bosses integral with said sleeve, said bosses being sloped radially outwardly in a direction toward said cylindrical sleeve surface from a diameter less than the inner diameter of said shell to a diameter greater than said inner diameter.

8. The coupling of claim 1 wherein:
said sleeve comprises an organic synthetic resin having a hardness of 50 to 70 on the Shore Scleroscope D scale.

9. The coupling of claim 8 wherein:
said flange means comprises seal rings conforming along their inner diameters to the smooth circumference ends of said hubs, and said sleeve end portions provide grooves for receiving outer circumferential portions of the seal rings.

10. The coupling of claim 8 wherein:
said flange means comprise integral portions of said sleeve, and buffer rings of a harder material secured along the axially inner surfaces of said integral flange portions.

11. The coupling of claim 1 wherein:
said edges of each sleeve define a notch recessed circumferentially from said parting plane in one edge and a complementary tongue projecting from its other edge from said plane enabling said section to meet along said plane in tongue-in-notch closely fitting relationship preventing axial displacement of one section relative to the other section.

* * * * *